(12) United States Patent
Zhang et al.

(10) Patent No.: US 11,630,936 B2
(45) Date of Patent: Apr. 18, 2023

(54) ROBUST OPTIMAL DESIGN METHOD FOR PHOTOVOLTAIC CELLS

(71) Applicant: Northwestern Polytechnical University, Xi'an (CN)

(72) Inventors: Feng Zhang, Xi'an (CN); Mingying Wu, Xi'an (CN); Xu Zhang, Xi'an (CN); Dongyue Wang, Xi'an (CN); Xiayu Xu, Xi'an (CN); Lei Cheng, Xi'an (CN)

(73) Assignee: Northwestern Polytechnical University, Xi'an (CN)

( * ) Notice: Subject to any disclaimer, the term of this patent is extended or adjusted under 35 U.S.C. 154(b) by 0 days.

(21) Appl. No.: 17/369,105

(22) Filed: Jul. 7, 2021

(65) Prior Publication Data

US 2022/0067258 A1 Mar. 3, 2022

(30) Foreign Application Priority Data

Aug. 26, 2020 (CN) .......................... 202010870653.0

(51) Int. Cl.

| | |
|---|---|
| *G06F 30/373* | (2020.01) |
| *G06F 30/398* | (2020.01) |
| *G06F 30/20* | (2020.01) |
| *G06F 17/11* | (2006.01) |
| *G06F 17/15* | (2006.01) |
| *G06F 17/17* | (2006.01) |
| *H02S 50/00* | (2014.01) |
| *H02J 7/00* | (2006.01) |

(Continued)

(52) U.S. Cl.
CPC ............ *G06F 30/373* (2020.01); *H02S 50/00* (2013.01); *G06F 17/11* (2013.01); *G06F 17/15* (2013.01); *G06F 17/17* (2013.01); *G06F 30/20* (2020.01); *G06F 30/398* (2020.01); *G06F 2119/02* (2020.01); *H01M 6/00* (2013.01); *H02J 7/00* (2013.01)

(58) Field of Classification Search
CPC ...... G06F 30/373; G06F 30/398; G06F 30/20; G06F 17/11; G06F 17/15; G06F 17/17; G06F 2119/02; H02J 7/00; H01M 6/00
USPC ...... 716/132, 54; 703/2, 6, 14; 320/101, 107
See application file for complete search history.

(56) References Cited

FOREIGN PATENT DOCUMENTS

| CN | 105260952 A | * | 1/2016 |
|---|---|---|---|
| CN | 105406509 A | * | 3/2016 |

(Continued)

*Primary Examiner* — Phallaka Kik
(74) *Attorney, Agent, or Firm* — Bayramoglu Law Offices LLC

(57) ABSTRACT

This invention relates to a robust optimal design method for photovoltaic cells. Firstly, the deterministic optimal model is established, which is solved by Monte Carlo method to obtain the maximum output power value of optimization objective and its corresponding design variable value, and then the design variable value obtained from deterministic optimization is deemed as the initial point of the mean value of the robust optimal design variable. Later, the robust optimal model is solved by Monte Carlo method in order to obtain the mean value of design variable, and then appropriate materials and manufacturing techniques are selected for corresponding photovoltaic components according to the design variable obtained, so as to achieve the robust optimal design of photovoltaic cells. In fact, this invention improves the output stability and reliability of photovoltaic cells.

1 Claim, 2 Drawing Sheets

(51) Int. Cl.
  *H01M 6/00*   (2006.01)
  *G06F 119/02*   (2020.01)

(56) References Cited

FOREIGN PATENT DOCUMENTS

| | | | | | |
|---|---|---|---|---|---|
| CN | 106532688 | A | * | 3/2017 | ................ H02J 3/00 |
| CN | 107256448 | A | * | 10/2017 | ......... G06Q 10/0635 |
| CN | 108549985 | A | * | 9/2018 | ....... G06Q 10/06315 |
| CN | 108565865 | A | * | 9/2018 | ................ H02J 3/06 |
| CN | 108879656 | A | * | 11/2018 | ................ H02J 3/00 |
| CN | 110311626 | A | * | 10/2019 | ............. G06F 17/10 |
| CN | 110380419 | A | * | 10/2019 | |
| CN | 110768294 | A | * | 2/2020 | ................ H02J 3/06 |
| CN | 111563231 | A | * | 8/2020 | |

* cited by examiner

ROBUST OPTIMAL DESIGN METHOD FOR PHOTOVOLTAIC CELLS

FIELD OF THE INVENTION

This invention falls within the field of photovoltaic cells, which relates to robust optimization of photovoltaic cell parameters. Establish the model of photovoltaic cells, then provide photovoltaic cell parameters with robust optimal design based on the given constraints, and solve the optimal design model by Monte Carlo method, so as to achieve the robust optimal design for photovoltaic cells.

BACKGROUND OF THE INVENTION

At present, the world's energy supply relies largely on fossil energy, and human beings are gradually facing the problems of environmental pollution and shortage of resources. In order to achieve the goal of sustainable development, it is necessary to develop and apply clean renewable energy with zero pollution. Among various renewable energy sources, solar energy is deemed as the most promising energy because photovoltaic cells can directly convert light energy into electric energy through photovoltaic effect. Therefore, it has broad prospects in the energy field and is of strategic importance.

At present, most of the studies on photovoltaic cells focus on the changes of light intensity and working temperature, and explore the impact of external environment changes on the output performance of photovoltaic cells. However, in actual production and life, diode, resistance, battery panel and other parts that affect the performance of photovoltaic cells may have a great impact on the output of photovoltaic cells due to such factors as uncertainties in material selection and different manufacturing techniques. These uncertainties will cause a lot of problems to power grid planning, system scheduling and the reliable and stable operation of power grid. Therefore, it has been extremely urgent to provide photovoltaic cells with optimal design, determine the selection of component materials and manufacturing techniques and ensure stable and reliable operation of photovoltaic cells.

In the past decades, various probabilistic modeling methods for uncertainty propagation have been developed, among which Monte Carlo method for uncertainty propagation based on sampling is the most widely used. The method is a statistical method that mainly uses the design variables or parameters in uncertainty model problems for random sampling and then solves the probability of these problems with random samples, which is of general application and typical robustness. At the highest quantitative level of structure, system or solution performance, uncertainty analysis based on Monte Carlo method is a common process. This invention solves robust optimal model by Monte Carlo method to achieve robust optimal design for photovoltaic cells.

SUMMARY OF THE INVENTION

Technical Problem to be Solved

The purpose of traditional photovoltaic cell optimization is to maximize the output power, but neglects output stability, so that the reliable operation of cells cannot be guaranteed. In order to avoid the inadequacies of existing technology, this invention proposes a robust optimal method for photovoltaic cells.

Technical Proposal

A robust optimal design method for photovoltaic cells, which is characterized that it comprises the following steps:

Step 1: Take the material parameters of photovoltaic components as design variable x and the temperature and radiation intensity in the actual working environment as design parameter z, and the specific distribution is as shown in Table 1 below:

TABLE 1

Distribution of Design Variables and Parameters of Photovoltaic Cells

| Parameter | Identification | Unit | Distribution type | Mean value | Standard deviation |
|---|---|---|---|---|---|
| $R_s$ | $x_1$ | Ω | Normal | [0.286, 0.656] | $9.596 \times 10^{-3}$ |
| $R_{sh}$ | $x_2$ | Ω | Normal | [802.24, 1602.24] | 22.2298 |
| C | $x_3$ | mA/C | Normal | [0.0059, 0.0061] | $1.2 \times 10^{-3}$ |
| n | $x_4$ | / | Normal | [1.18, 1.6] | 0.03 |
| s | $z_1$ | W/m$^2$ | Normal | 600 | 8 |
| T | $z_2$ | K | Normal | 303.15 | 6.063 |

Take the maximum output power of photovoltaic cells as optimization objective and theoretical efficiency of the studied cell as constrained performance function to establish the deterministic optimal model as follows:

Find $x1 x2 x3 x4$

Max $P(x,z)$ $s.t. g(x,z) = \eta(x,z) - 0.159 \leq 0$ $0.286 \leq x1 \leq 0.656, 802.24 \leq x2 \leq 1602.24$ $0.0059 \leq x3 \leq 0.0061, 1.18 \leq x4 \leq 1.6$ Solve the deterministic optimal model by Monte Carlo method to obtain the maximum output power value $P_{max}$ of the optimization objective and its corresponding design variable value $x = \{x1, x2, x3, x4\}$;

Step 2: Take the design variable value obtained from deterministic optimization as the initial point of the mean value of robust optimal design variable ($\mu x' = \{x_1, x_2, x_3, x_4\}$), and then obtain the robust optimal model based on the mean value and standard deviation after conversion, which is expressed as follows:

$\mu_{x_1}, \mu_{x_2}, \mu_{x_3}, \mu_{x_4}$, $\text{Min} \dfrac{\sigma_P(x,z)}{\mu_P(x,z)}$ $s.t. G(x,z) = \mu g(x,z) \leq 0$ $0.286 \leq \mu_{x_1} \leq 0.656, 802.24 \leq \mu_{x_2} \leq 1602.24$ $0.0059 \leq \mu_{x_3} \leq 0.0061, 1.18 \leq \mu_{x_4} \leq 1.6$ Step 3: Solve the robust optimal model by the Monte Carlo method to obtain the mean value $\mu_x = \{\mu_{x1}, \mu_{x2}, \mu_{x3}, \mu_{x4}\}$ of design variables, and then select the corresponding materials and manufacturing techniques of photovoltaic components according to the obtained µx, so as to achieve robust optimal design for photovoltaic cells.

Beneficial Effect

This invention proposes a robust optimal design method for photovoltaic cells, namely to establish a robust optimal model, solve the optimal model and obtain the values of corresponding design variables. Although the output power of photovoltaic cells under the deterministic optimal model is higher than that under the robust optimal model, the standard deviation and failure probability of constraints after robust optimization are smaller than those after deterministic optimization, and the output fluctuations become smaller, which improves the stability and reliability of the output of photovoltaic cells, is of great importance for the study on the output performance of photovoltaic cells, and enhances the application level of photovoltaic cells.

DESCRIPTION OF THE INVENTION

Figure 2:
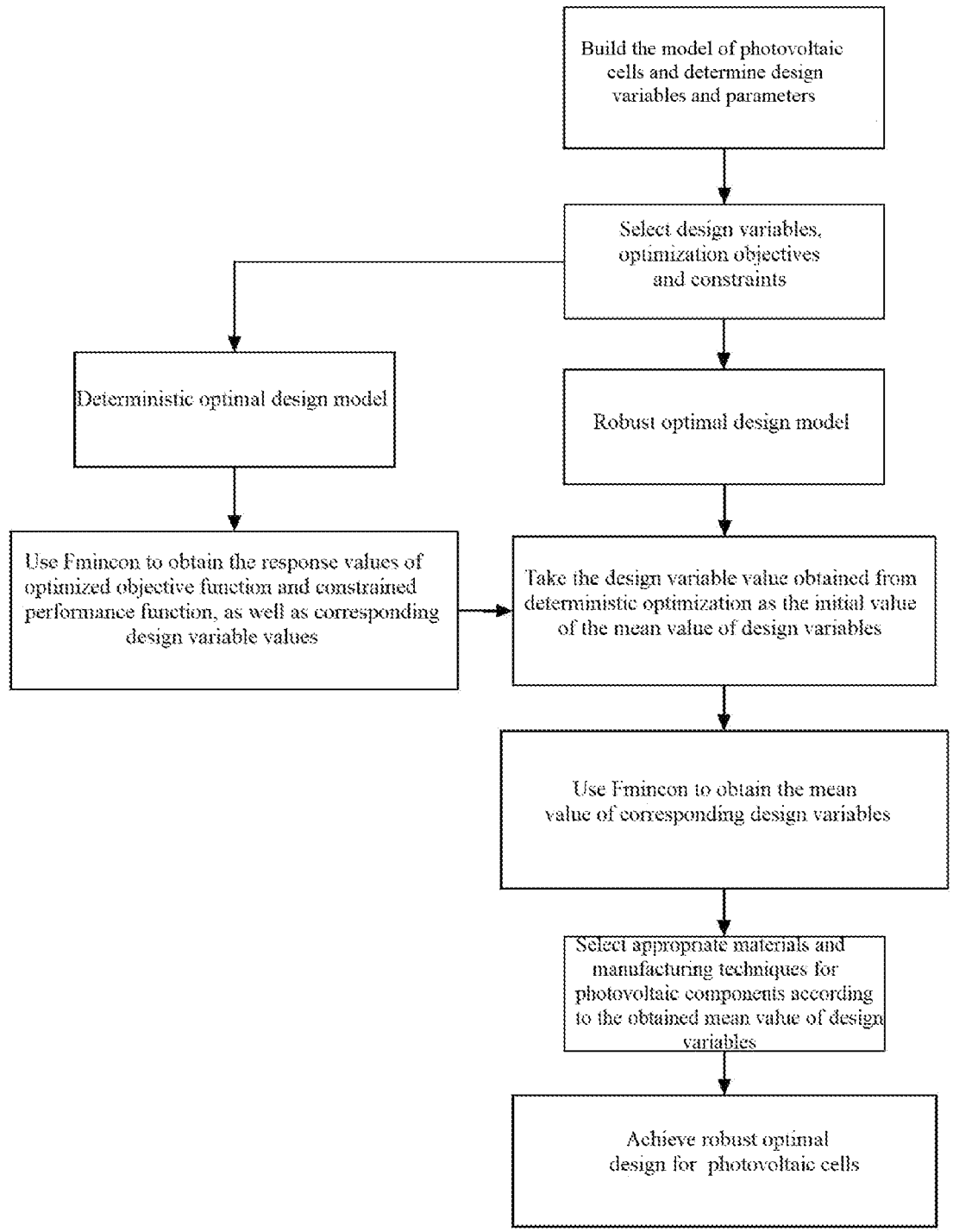
FIG. 2 Flow Chart of Robust Optimal Design for Photovoltaic Cells.

This invention takes the reliability and stability of the output of photovoltaic cells as objective, takes into account the randomness in the actual working environment of photovoltaic cells and the internal uncertainty in the material properties of photovoltaic components, deems the minimum ratio of standard deviation to mean value of the output power of photovoltaic cells under the co-influence of randomness and interval uncertainty as optimization objective, regards the given theoretical conversion efficiency as constrained performance function, establishes the robust optimal model, and solves the model by Monte Carlo method. The flow chart is shown in FIG. 2, which includes the following steps:

Step 1: Establish the model of photovoltaic cells

Figure 1:
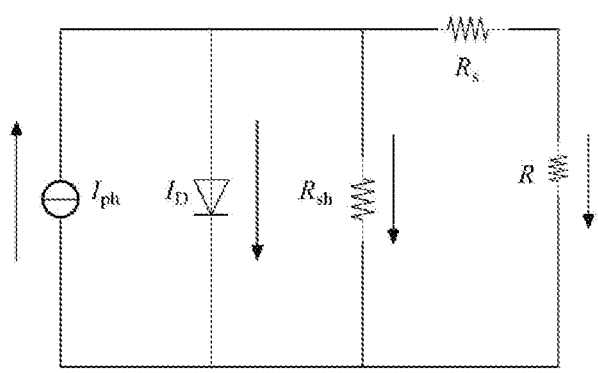
FIG. 1 Equivalent Circuit Diagram of Photovoltaic Cells.

The equivalent circuit of photovoltaic cells is composed of the constant flow source that generates photo-generated current and a series of resistances (internal shunt resistance Rsh and series resistance Rs), as shown in FIG. 1.

It can be obtained as follows according to the equivalent circuit of photovoltaic cells:

$$I = I_{ph} - I_D - I_{sh} \quad (1)$$

It can be obtained as follows according to the principle of diode:

$$I_D = I_o\left(\exp\frac{q(V + IR_s)}{nKT} - 1\right) \quad (2)$$

It can be obtained according to the Kirchhoff principle:

$$I_{sh} = \frac{V + IR_s}{R_{sh}} \quad (3)$$

It can be obtained as follows according to Simultaneous Equations (1), (2) and (3):

$$I = I_{ph} - I_o\left(\exp\frac{q(V + IR_s)}{nKT} - 1\right) - \frac{V + IR_s}{R_{sh}} \quad (4)$$

In Equations (1), (2), (3) and (4): I refers to the output current of photovoltaic cells; Iph refers to photo-generated current; ID refers to the current of the diode; Ish refers to the current of equivalent shunt resistance that flows through photovoltaic cells; Io refers to reverse saturation current of the diode; V refers to the output voltage of photovoltaic cells; q refers to the electron charge; n refers to the impact factor of the diode; K refers to Boltzmann constant; T refers to the surface temperature of photovoltaic cells; Rs refers to the equivalent series resistance of photovoltaic cells; Rsh refers to the equivalent shunt resistance of photovoltaic cells.

In order to facilitate the follow-up calculation, it is necessary to obtain the explicit equipment of current, so that the current item will not be contained on the right side of the equation. The explicit equation of current is obtained according to Lambert W function:

$$I = \frac{R_{sh}(I_{ph} + I_o) - V}{R_s + R_{sh}} - \frac{nV_{th}}{R_s}W(X) \quad (5)$$

Where, $$V_{th} = \frac{nKT}{q}, \quad X = \frac{I_0 R_{sh} R_s}{nV_{th}(R_s + R_{sh})}\exp\left(\frac{R_{sh}(R_s I_{ph} + R_s I_o + V)}{nV_{th}(R_s + R_{sh})}\right) \quad (6)$$

In Equation (4), Iph and Io are model parameters, which are the functions of temperature and light intensity. The calculation methods are as follows:

$$I_{ph} = \frac{S}{S_{ref}}[I_{ph,ref} + C(T - T_{ref})] \quad (7)$$

$$\frac{I_o}{I_{o,ref}} = \left(\frac{T}{T_{ref}}\right)^3 \exp\left(\frac{q}{nK}\left(\frac{E_{g,ref}}{T_{ref}} - \frac{E_g}{T}\right)\right) \quad (8)$$

In Equations (7) and (8), S refers to radiation intensity; T refers to cell temperature; C refers to temperature coefficient of short circuit current; Eg refers to material energy gap, whose temperature characteristic is $E_g/E_{g,ref} = 1 - 1.0002677(T - T_{ref})$; the subscript ref means under standard test conditions.

The output power P can be obtained as shown in the following equation:

$$P = IV =$$

$$\frac{\{R_{sh}\{\{S[I_{ph,ref} + \alpha_{I,sc}(T - T_{ref})]\}/S_{ref} + \{I_{o,ref}T^3\exp[-(E_g/T - E_{g,ref}/T_{ref})/K]\}/T_{ref}^3\} - V\}}{(R_s + R_{sh})}$$

$$\left\{ TK_n * \text{lambertw} \left( \begin{array}{c} 0, \left\{ I_{o,ref}R_sR_{sh}T^2q \exp\left\{ \dfrac{R_{sh}q\left\{ \begin{array}{c} \{R_sS[I_{ph,ref} + \alpha_{I,sc}(T - T_{ref})]\}/S_{ref} + \\ \{I_{o,ref}R_sT^3\exp[-(E_g/T - E_{g,ref}/T_{ref})/K]\}/T_{ref}^3 \end{array} \right\}}{Tkn(R_s + R_{sh})} + \left[ \dfrac{-(E_g/T - E_{g,ref}/T_{ref})}{K} \right] \right\} \right. \\ \left. /[T_{ref}^3 kn(R_s + R_{sh})] \end{array} \right) \right\}$$

$$R_s q$$

The conversion efficiency η of photovoltaic cells is as follows:

$$\eta = \frac{I_m V_m}{AS} \quad (10)$$

Where, Vm refers to the voltage of the maximum power point; Im refers to the current of the maximum power point; A refers to cell area.

The output performance of photovoltaic cells is affected by the actual working environment. At the same time, photovoltaic components such as diode, resistance and battery panel in photovoltaic cells may face uncertainties in component parameters due to inevitable factors such as manufacturing and installation errors and dispersion of materials. Under the combined action of random working environment and parameter uncertainty, the output of photovoltaic cells may change a lot. Take the material parameters of photovoltaic components as design variable x and temperature and radiation intensity in the actual working environment as design parameter z, and the specific distribution is shown in Table 1 below.

TABLE 1

Distribution of Design Variables and Parameters of Photovoltaic Cells

| Parameter | Identification | Unit | Distribution type | Mean value | Standard deviation |
|---|---|---|---|---|---|
| $R_s$ | $x_1$ | Ω | Normal | [0.286, 0.656] | $9.596 \times 10^{-3}$ |
| $R_{sh}$ | $x_2$ | Ω | Normal | [802.24, 1602.24] | 22.2298 |
| C | $x_3$ | mA/C | Normal | [0.0059, 0.0061] | $1.2 \times 10^{-3}$ |
| n | $x_4$ | / | Normal | [1.18, 1.6] | 0.03 |
| s | $z_1$ | W/m² | Normal | 600 | 8 |
| T | $z_2$ | K | Normal | 303.15 | 6.063 |

Step 2: Establish robust optimal design model

Take the maximum output power of photovoltaic cells as optimization objective and theoretical efficiency of the studied cell as constrained performance function to establish the deterministic optimal model as follows:

Find $x_1 x_2 x_3 x_4$

Max $P(x,z)$ $s.t. g(x,z) = \eta(x,z) - 0.159 \leq 0$ $0.286 \leq x_1 \leq 0.656, 802.24 \leq x_2 \leq 1602.24$ $0.0059 \leq x_3 \leq 0.0061, 1.18 \leq x_4 \leq 1.6$ Given the fact that the mean value of design variables can better reflect the real results, take the mean value of original design variables as the design variable of the new model, so that the robust optimal model based on mean value and standard deviation can be obtained after conversion according to the above-mentioned deterministic optimal design model, which is expressed as follows:

$$\mu_{x_1}, \mu_{x_2}, \mu_{x_3}, \mu_{x_4},$$

$$\text{Min} \frac{\sigma_P(x,z)}{\mu_P(x,z)}$$

$$s.t. G(x,z) = \mu g(x,z) \leq 0$$

$0.286 \leq \mu_{x_1} \leq 0.656, 802.24 \leq \mu_{x_2} \leq 1602.24$ $0.0059 \leq \mu_{x_3} \leq 0.0061, 1.18 \leq \mu_{x_4} \leq 1.6$ Step 3: Solve the robust optimal model Monte Carlo method is an effective appropriate simulation method which solves uncertain numerical values based on random sampling. The method is a statistical method that mainly uses the design variables or parameters in uncertainty model problems for random sampling and then solves the probability of these problems with random samples. As a very direct and simple estimation method, the expressions for solving the mean value and variance are as follows:

$$\mu_Y \approx \frac{1}{N} \sum_{i=1}^{n} y(x_i, z_i) \quad (11)$$

$$\sigma_Y^2 \approx \frac{1}{N-1} \sum_{i=1}^{n} [y(x_i, z_i) - \mu_Y]^2 \quad (12)$$

Where, N refers to sample size, xi and zi refer to the sample point of design variable and design parameters, respectively.

The integral expression of solving the failure probability of constraints by Monte Carlo method is shown in Equation (12) below.

$$P_f = \int_F f(X)dX = \int I_F f(X)dX \quad (13)$$

Where, f(X) refers to the joint probability density function with variable X={x1, x2, x3, x4, z1, z2}, F s, refers to the failure domain that does not meet constraint and Pf refers to failure probability.

The specific solving process is as follows:

Firstly, use Monte Carlo method to solve deterministic optimal model to obtain the maximum output power value of optimization objective and its corresponding design variable value x={x1, x2, x3, x4}, as shown in Line 2, Table 2. Take the design variable value obtained from deterministic optimization as the initial point μx'={x1, x2, x3, x4} of the mean value of robust optimal design variable, then solve the robust optimal model by Monte Carlo method to obtain the mean value μx={μx1, μx2, μx3, μx4} of design variables, as shown in Line 3, Table 2. Later, select appropriate materials and manufacturing techniques for corresponding photovoltaic components according to the obtained μx, so as to achieve robust optimal design for photovoltaic cells.

Embodiment 1

Step 1: Establish the model of photovoltaic cells, determine design variables x1, x2, x3 and x4 and design parameters z1 and z2 of photovoltaic cells according to engineering experience, and set the value range of the design variable x, and the specific distribution is shown in Table 1.

Step 2: Take the maximum output power of photovoltaic cells as optimization objective and theoretical efficiency as constrained performance function to establish the traditional deterministic optimal model; then take the mean value of original design variables as the design variable of the new model, minimum ratio of standard deviation to mean value of the output power of photovoltaic cells as optimization objective and the mean value of theoretical efficiencies as constrained performance function, and convert the deterministic optimal design model into the robust optimal model based on mean value and standard deviation.

Step 3: Complete initial sampling of design variables and parameters through simple random sampling, take design variable x as independent control parameter, use Fmincon function in Matlab to obtain the response values of deterministic optimal objective function and constrained performance function, as well as the value of the corresponding design variable {0.286, 1602.24, 0.0061, 1.6}; take the design variable x={0.286, 1602.24, 0.0061, 1.6} obtained from deterministic optimization as the initial point of the mean value of robust optimal design variable, use Fmincon function in matlab to obtain the response value of robust optimal objective function and constrained performance function, as well as the value rangeμx={0.4778, 1601.2452, 0.005996, 1.3874} of the mean value of corresponding design variable; select appropriate materials and manufacturing techniques of corresponding photovoltaic components according to the obtained μx to achieve robust optimal design for photovoltaic cells.

Both x and μx obey normal distribution. According to Equations (10) and (11), the mean value and variance of deterministic optimal and robust optimal constraints can be solved separately, as shown in Table 3. According to Equation (12), the failure probability can be separately solved when the deterministic optimal and robust optimal constraints fail, as shown in Table 4. (In order to facilitate calculation, N is set to 100000). Although the output power of photovoltaic cells under the deterministic optimal model is higher than that under the robust optimal model, the standard deviation and failure probability of constraints after robust optimization are smaller than those after deterministic optimization, and the output fluctuations become smaller, which improves the stability and reliability of the output of photovoltaic cells.

TABLE 2

Calculation Results of Optimal Model

| Optimization method | $\mu_{x_1}$ | $\mu_{x_2}$ | $\mu_{x_3}$ | $\mu_{x_4}$ |
|---|---|---|---|---|
| Deterministic optimization | 0.286 | 1602.24 | $0.61 \times 10^{-2}$ | 1.6 |
| Robust optimization | 0.4778 | 1601.2452 | $0.5996 \times 10^{-2}$ | 1.387 |

TABLE 3

Results of Robust Optimization and Deterministic Optimization

| Optimization method | $\mu_g$ | $\sigma_g$ |
|---|---|---|
| Deterministic optimization | 0.1592 | $6.4944 \times 10^{-4}$ |
| Robust optimization | 0.159 | $6.3686 \times 10^{-4}$ |

TABLE 4

Failure Probability of Constraints under Different Optimization Results

| Optimization method | Failure probability $P_f$ |
|---|---|
| Deterministic optimization | 0.6354 |
| Robust optimization | 0.4608 |

What is claimed is:

1. A robust optimal design method for photovoltaic cells, which is characterized that it comprises the following steps:
   Step 1: Take material parameters of photovoltaic components as design variable x and temperature and radiation intensity in an actual working environment as design parameter z, and a specific distribution is as shown in Table 1:

TABLE 1

Distribution of Design Variables and Parameters of Photovoltaic Cells

| Parameter Name | Identification | Unit | Distribution Type | Mean Value | Standard Deviation |
|---|---|---|---|---|---|
| $R_x$ | $x_1$ | Ω | Normal Distribution | [0.286, 0.656] | $9.596 \times 10^{-3}$ |
| $R_{sh}$ | $x_2$ | Ω | Normal Distribution | [802.24, 1602.2] | 22.2298 |
| C | $x_3$ | mA/C | Normal Distribution | [0.0059, 0.0061] | $1.2 \times 10^{-3}$ |
| n | $x_4$ | / | Normal Distribution | [1.18, 1.6] | 0.003 |

TABLE 1-continued

Distribution of Design Variables and Parameters of Photovoltaic Cells

| Parameter Name | Identification | Unit | Distribution Type | Mean Value | Standard Deviation |
|---|---|---|---|---|---|
| S | $z_1$ | W/m² | Normal Distribution | 600 | 8 |
| T | $z_2$ | K | Normal Distribution | 303.15 | 6.063 | wherein $R_s$ is equivalent series resistance of photovoltaic cells, $R_{SH}$ is equivalent shunt resistance of photovoltaic cells, C is temperature coefficient of short circuit current, n is diode ideality factor, S is radiation intensity, and T is surface temperature of photovoltaic cells, Take a maximum output power of photovoltaic cells as optimization objective and theoretical efficiency of a studied cell as constrained performance function to establish a deterministic optimal model as follows:

Find x1, x2, x3, x4, and Max P(x,z), wherein Max P(x,z) is maximum output power of photovoltaic cells, given:

s.t.g(x,z)=η(x,z)−0.159≤0, wherein s.t.g is objective function corresponding to inequality constraints about conversion efficiency and η is conversion efficiency of photovoltaic cells;

0.286≤x1≤0.656, 802.24≤x2≤1602.24;

0.0059≤x3≤0.0061, 1.18≤x4≤1.6; and

Solve the deterministic optimal model by Monte Carlo method to obtain the maximum output power value Max P(x,z) of the optimization objective and its corresponding design variable value x={x1, x2, x3, x4};

Step 2: Take the design variable value obtained from deterministic optimization as an initial point of a mean value of robust optimal design variable ($\mu x' = \{x_1, x_2, x_3, x_4\}$), and then obtain a robust optimal model based on the mean value and standard deviation after conversion as listed in Table 1, which is expressed as follows:

Find $\mu_{x_1}, \mu_{x_2}, \mu_{x_3}, \mu_{x_4}$, $$\text{Min} \frac{\sigma_p(x, z)}{\mu_p(x, z)},$$

wherein $\sigma_p$ is mean value of output power and $\mu_p$ is standard deviation of output power, given:

s.t.G(x,z)=$\mu_{g(x,z)}$≤0, wherein s.t.G is objective function corresponding to inequality constraints on mean value of the conversion efficiency and g is objective function corresponding to inequality constraints about conversion efficiency, 0.286≤$\mu_{x_1}$≤0.656, 802.24≤$\mu_{x_2}$≤1602.24

0.0059≤$\mu_{x_3}$≤0.0061, 1.18≤$\mu_{x_4}$≤1.6; and

Step 3: Solve the robust optimal model by Monte Carlo method to obtain a mean value $\mu_x\{\mu_{x_1}, \mu_{x_2}, \mu_{x_3}, \mu_{x_4}\}$, of design variables, and then select corresponding materials and manufacturing techniques of photovoltaic components according to the obtained µx, so as to achieve robust optimal design for photovoltaic cells.

* * * * *